C. HAMMER.

BOTTLE OR JAR CLOSURE.

APPLICATION FILED MAY 15, 1914.

Reissued Aug. 31, 1915.

13,973.

WITNESSES:

Marshall Low

E. C. Loveless.

INVENTOR

Charles Hammer,

BY W. H. C. Clarke.

ATTORNEY

UNITED STATES PATENT OFFICE.

CHARLES HAMMER, OF CLIFFSIDE, NEW JERSEY, ASSIGNOR TO THE AMERICAN METAL CAP CO., OF BUFFALO, NEW YORK, A CORPORATION OF NEW YORK.

BOTTLE OR JAR CLOSURE.

13,973. Specification of Reissued Letters Patent. Reissued Aug. 31, 1915.

Original No. 1,028,718, dated June 4, 1912, Serial No. 666,128. Application for reissue filed May 15, 1914. Serial No. 838,877.

*To all whom it may concern:*

Be it known that I, CHARLES HAMMER, a citizen of the United States, residing at Cliffside, in the county of Bergen and State of New Jersey, have invented new and useful Improvements in Bottle or Jar Closures, of which the following is a specification.

This invention relates to bottle or jar closures of that type employing metal sealing caps provided with inpunched locking projections to engage separated spiral threads upon the mouth of the bottle or jar, whereby the cap is fastened in sealing position.

The primary object of my invention is to provide a sealing cap which may be made of thin metal, and yet possess maximum strength and durability, and in which the inpunched locking projections are so constructed and arranged as to have a double locking action with superposed threads upon the bottle or jar, whereby the efficiency of the seal is increased.

A further object of the invention is to provide a bottle cap in which the parts are combined and arranged to manually reinforce each other, to prevent buckling of the cap under the strain upon the locking projections, or stretching of the flange of the cap in application when the threads are of abnormal size.

Figure 1:
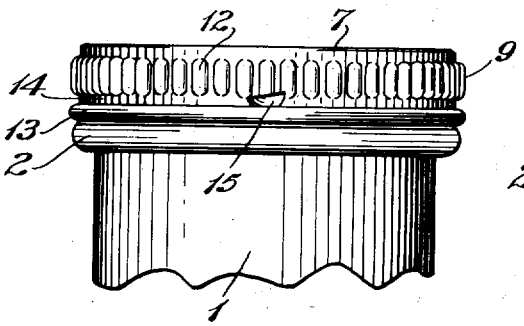
Figure 2:
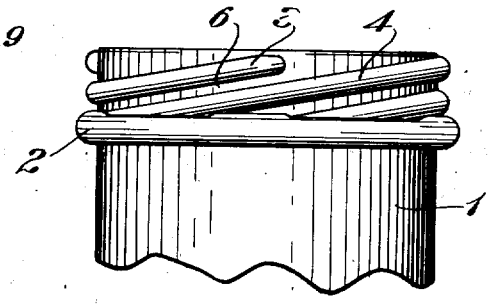
Figure 3:
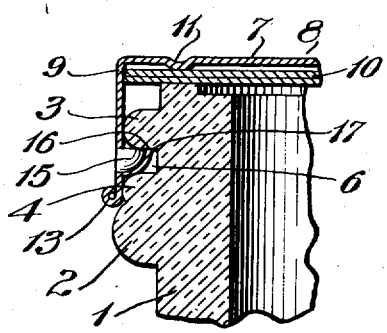
Figure 4:
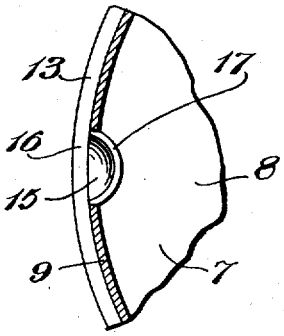
Figure 5:
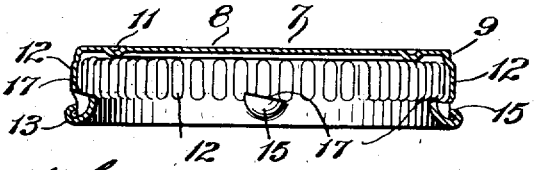

The invention consists of the features of construction, combination and arrangement of parts, hereinafter fully described and claimed, reference being had to the accompanying drawing, in which:

Figure 1 is a side elevation of a bottle neck showing the application of the sealing cap. Fig. 2 is a side elevation of the jar neck with the cap detached. Fig. 3 is a vertical transverse section through one side of the jar and the adjacent side of the flange of the cap. Fig. 4 is a horizontal section through the flange of the cap on an enlarged scale, showing one of the locking projections. Fig. 5 is a sectional view through the cap looking toward the inner side of the flange thereof.

Referring to the drawing, 1 designates the neck of a bottle or jar which may be of any suitable form, size, shape and construction. This neck 1 is formed adjacent to the upper end thereof with an annular rib or shoulder 2. Extending upward from said rib or shoulder 2 is a plurality of separated spiral threads 3 and 4, arranged in spaced pairs to produce intervening guide grooves 6. The number of pairs of threads employed may vary under different conditions of service, but, in the present instance, I have shown the neck provided with four pairs of threads in order that a locking action may be obtained at quarter points around the circumference of the cap.

The cap 7 is formed of thin sheet metal, and comprises a top or crown portion 8 provided with a depending annular flange 9 of proper diameter to snugly embrace the threaded portion of the bottle or jar neck. This cap is adapted to be used with a suitable inner sealing disk or liner 10, and its top or crown portion may be provided with an annular depressed rib 11 to bear against and crimp the liner for a tight sealing action against the rim edge of the neck when the cap is applied for use.

The flange 9 is formed with an annular series of outstruck vertical corrugations or milling projections 12, which serve the double function of stiffening the flange and forming a roughened peripheral surface to facilitate the application of the cap to and its removal from the bottle. These corrugations terminate at their upper ends below the top of the flange and at their lower ends some distance above the lower edge of the flange, which latter is bent upward to form an annular reinforcing bead 13, spaced from the corrugations to leave an intervening plain or unstiffened surface 14. By this construction and arrangement of the corrugations and bead the flanges are stiffened and strengthened to a maximum degree, allowing the cap to be made of very thin metal without liability of its buckling or becoming distorted out of shape under pressure when applied and removed.

The cap is formed with a series of semi-elliptical instruck locking projections 15, equal in number to the pairs of separated threads 3 and 4 on the neck, and arranged in the construction shown equidistantly around the circumference of the flange. These projections are formed in the plain portion 14 of the flange at the bases of adjacent corrugations. As shown, each projection is separated by a slit 16 from the contiguous corrugations so as to provide a bearing edge 17 to engage the lower surface of the upper thread 3. The body portion of the projection is longitudinally and transversely curved or rounded and is adapted to engage the upper surface of the coacting lower thread 4. In order to secure this double binding action of the locking projections upon the upper and lower threads, the body and bearing edge of each projection are inclined at an angle to the horizontal or at an angle corresponding to the angle of inclination of the threads. The semi-elliptical shape of the projections gives maximum strength to prevent their distortion under the pressure of the threads, and, as the projections lie between the stiffening corrugations and stiffening bead, the strength of said projections is further promoted.

When the cap is screwed upon the threads 3 and 4, the projections pass into the spaces 6; and as the cap is screwed home, the edge 17 of each projection will engage the lower face of the thread 3 above it and the inner convex face of each projection will rest upon the thread 4 below it. I prefer to round off the threads as shown in Fig. 3 and when the cap 7 is screwed on tight, each projection will bind between two threads and lock the cap in place. In other words, the shape of the projections is such that a wedging action will be produced and each will be forced firmly into one of the spaces 6.

As the function of the corrugations 12 is to stiffen the flange, I, of course, locate the projections 15 in such positions that they will not interfere with the corrugations; that is I place them between the corrugations and the bead 13. It is important that they should be located as close to the bead as possible for the purpose of giving the smooth portion 14 no more width than is necessary and thus saving metal; and for the additional purpose of preventing the distortion of the flange when the closure is screwed home. Owing to the fact that the projections 15 are cut loose, so to speak, or freed along their upper edges 17 from the flange 9; but are integral with the flange at all other points, the threads 3 tend to turn these projections downward; and, therefore, exert a stress upon the portions of the flange at each of these projections, which tends to make the metal twist or buckle outward when the closure is screwed up to force the bead 13 tight against the bead 2. These conditions will be clearly understood upon a close inspection of Fig. 3. When the bead 13 meets the bead 2, any further tightening of the cap will cause the pressure between the upper edge 17 of each of the projections and the lower face of the upper thread 3, to increase; and the effect of this pressure is to tend to force each projection downward and outward, owing to the convexity of the inner face of each projection and the upper face of the adjacent lower thread 4. If it were not for the bead 13 being as close as possible to the base of each projection, the metal thereon would, therefore, turn upward and outward and thus cause the cap to buckle and be otherwise distorted. The structural relation between the projections and the bead counteracts this tendency and preserves the cap against deformation. At the same time the requisite stiffness is given to the flange by means of the corrugations 12.

I am aware that it is old to form a bead around the lower edge of the flange of a cap, but I believe I am the first to locate inward extending projections, having their upper edges cut loose, near the bead of a metal cap in such a manner as to afford the advantages above noted. The construction above outlined also enables me to have the projections 15 as near to the beaded edge as possible and permits me to form the corrugations 12 over as much of the circumference of the flange as may be desired, to afford a good grip to the hand of the user; and it will be observed that, as above noted, the projections are separated from the corrugations so that the user is not likely to scratch his fingers on the edges of the cuts or slits when he screws the cap in place. By preventing the flange 9 from buckling, the liability of other parts of the cap becoming distorted in use is, of course, eliminated.

It is, of course, possible to strengthen the edge of the flange in a manner other than by forming a bead on the same; and the results above noted, as regards the prevention of distortion in the flange adjacent the projections 15, when these projections are pressed upon from within the flange, may be otherwise secured. I, therefore, do not wish to restrict myself to a bead for this purpose; neither do I wish to be restricted to the exact number or shape of the projections 15 above disclosed so long as proper coöperation between the strengthening edge of the flange and the projections is obtained.

From the above description it will be seen that I have provided a closure which may be made of comparatively thin stock, and be strong enough to withstand considerable stress; so that it can be screwed tight enough upon the mouth of the storage vessel to be practically perfect in its sealing action. While the above construction is thought to be preferable to give the advantages herein set forth I nevertheless desire the same to be taken as illustrative only. I do not wish to be limited to the exact details herein set forth, but I reserve the right to make such changes in the shape, size and arrangement of the various parts as fairly fall within the scope and spirit of my invention.

Having thus described the invention, what I claim as new is:

1. A bottle cap formed of thin sheet metal and having a flange provided with a series of vertical stiffening corrugations, a stiffening bead or rim formed at the lower edge of the flange, and an intervening unstiffened portion, said unstiffened portion being provided with a series of instruck locking projections intersecting and reinforced by the adjacent corrugations and portions of the stiffening bead or rim, said projections being of semi-elliptical form with their major axes disposed at an angle to the plane of the flange, said projections being longitudinally and transversely curved and inclined to the horizontal plane of the cap and having their upper edges separated from the flange and their lower surfaces rounded, whereby said edges and rounded lower surfaces of the projections are adapted to bind respectively upon the lower and upper surfaces of pairs of coacting superposed spiral threads on a receptacle.

2. The combination with a receptacle having pairs of spaced superposed separated spiral threads, of a thin sheet metal cap having a flange provided with an upper corrugated portion spaced from the side of the receptacle a distance equivalent to the thickness of the threads and terminating about in line with the bottom faces of the upper threads, a stiffening bead or rim at its lower edge arranged in line with the outer faces of the lower threads and an intermediate unstiffened portion disposed opposite the space between the threads, said unstiffened portion being provided with instruck locking projections disposed between said corrugations and bead and separated by slits from the adjacent corrugations, said projections being longitudinally and transversely bowed and reinforced by the adjacent corrugations and portions of the rim and bead, the upper edges of said locking projections being arranged to bear against the lower faces of the upper threads and the outwardly and downwardly curved inner faces thereof arranged to bind against the upper surfaces of the lower threads.

3. A closure for a storage vessel, comprising a flange having a strengthened portion, and one or more projections beginning at said portion and extending inward from the flange, and being freed from the flange at their inner ends, the strengthened portion preventing distortion of the flange when the projections are subjected to pressure from inside the flange.

4. A closure for a storage vessel comprising a top, a flange provided with a strengthened edge and one or more projections formed in the flange, said projections beginning at the strengthened edge and extending inward from the flange and toward the top, and being freed from the flange at their inner ends, the strengthened edge preventing distortion of the flange when said projections are subjected to pressure from inside the flange.

5. A closure for a storage vessel comprising a top, a flange having corrugations across the same and a strengthened edge and one or more projections formed in the flange between the edge and the top, said projections beginning at the strengthened edge and extending inward and toward the top, and being freed from the flange at their inner ends, the strengthened edge preventing distortion of the flange when the projections are subjected to pressure from inside the flange.

6. A closure for a storage vessel comprising a top, a flange having corrugations across the same and a strengthened edge, the corrugations terminating short of the strengthened edge, and one or more projections formed in the flange between the corrugations and the strengthened edge, the said projections extending inward and toward the top, and being freed from the flange at their inner ends, the strengthened edge preventing distortion of the flange when the projections are subjected to pressure from inside the flange.

Signed at borough of Brooklyn, in the county of Kings and State of New York this 16th day of February A. D. 1914.

CHARLES HAMMER.

Witnesses:
CHRISTIAN H. WERNER,
FREDERICK T. SHAW.

Correction in reissue Letters Patent No. 13,973.

It is hereby certified that the residence of the assignee in reissue Letters Patent No. 13,973, granted August 31, 1915, upon the application of Charles Hammer, of Cliffside, New Jersey, for an improvement in "Bottle or Jar Closures," was erroneously given as "Buffalo, New York," whereas said residence should have been given as *Brooklyn, New York*, as shown by the records of assignments in this office; and that the said Letters Patent should be read with this correction therein that the same may conform to the record of the case in the Patent Office.

Signed and sealed this 12th day of October, A. D., 1915.

[SEAL.]

R. F. WHITEHEAD,
*Acting Commissioner of Patents.*

Cl. 215—85.